(12) United States Patent
Brott et al.

(10) Patent No.: US 8,035,771 B2
(45) Date of Patent: Oct. 11, 2011

(54) STEREOSCOPIC 3D LIQUID CRYSTAL DISPLAY APPARATUS WITH STRUCTURED LIGHT GUIDE SURFACE

(75) Inventors: Robert L. Brott, Woodbury, MN (US); John C. Schultz, Afton, MN (US); John C. Nelson, The Sea Ranch, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 688 days.

(21) Appl. No.: 11/865,916

(22) Filed: Oct. 2, 2007

(65) Prior Publication Data

US 2008/0084518 A1   Apr. 10, 2008

Related U.S. Application Data

(60) Provisional application No. 60/828,399, filed on Oct. 6, 2006.

(51) Int. Cl.
*G02F 1/1335* (2006.01)
*F21V 7/04* (2006.01)
*G02B 6/10* (2006.01)

(52) U.S. Cl. ............ 349/65; 349/15; 362/333; 362/339; 362/606; 362/607; 362/620; 362/626; 385/146; 385/901; 345/102

(58) Field of Classification Search .............. 349/15, 349/62, 64, 65; 362/235, 332, 333, 339, 362/606–607, 617, 619–620, 625, 626; 385/146; 385/901; 345/102
See application file for complete search history.

(56) References Cited

U.S. PATENT DOCUMENTS

| | | | |
|---|---|---|---|
| 5,897,184 A | | 4/1999 | Eichenlaub et al. |
| 5,929,951 A | | 7/1999 | Sasakura et al. |
| 5,999,685 A | * | 12/1999 | Goto et al. ............. 385/146 |

(Continued)

FOREIGN PATENT DOCUMENTS

JP    2005-266293    9/2005

(Continued)

OTHER PUBLICATIONS

Ishikawa et al. "New Design for a Highly Collimating Turning Film," Eastman Kodak Company, SID 06 Digest, p. 514-517, 2006.

*Primary Examiner* — Uyen Chau N Le
*Assistant Examiner* — Michael Mooney

(57) ABSTRACT

A stereoscopic 3D liquid crystal display apparatus includes a liquid crystal display panel, a backlight positioned to provide light to the liquid crystal display panel, and a double sided prism film disposed between the liquid crystal display panel and the backlight. The backlight includes a light guide having a first side and a second side opposite the first side, and having a first surface extending between the first and second sides and a second surface opposite the first surface. The first surface substantially re-directs light and the second surface substantially transmits light. A plurality of first light sources is arranged along the first side of the light guide for transmitting light into the light guide from the first side. A plurality of second light sources is arranged along the second side of the light guide for transmitting light into the light guide from the second side. The second surface includes a regular array of linear prism or lenticular features. A double sided prism film is disposed between the liquid crystal display panel and the regular array of linear prism or lenticular features.

20 Claims, 2 Drawing Sheets

U.S. PATENT DOCUMENTS

| | | |
|---|---|---|
| 6,271,896 B2 | 8/2001 | Moseley et al. |
| 6,379,017 B2 * | 4/2002 | Nakabayashi et al. ......... 362/619 |
| 6,425,673 B1 * | 7/2002 | Suga et al. .................... 362/613 |
| 6,473,141 B2 | 10/2002 | Moseley et al. |
| 6,576,887 B2 | 6/2003 | Whitney et al. |
| 6,618,530 B1 | 9/2003 | Lundin |
| 6,831,624 B1 | 12/2004 | Harrold |
| 6,845,212 B2 | 1/2005 | Gardiner et al. |
| 6,970,290 B1 | 11/2005 | Mashitani et al. |
| 7,046,905 B1 | 5/2006 | Gardiner et al. |
| 7,057,638 B1 | 6/2006 | Yuuki et al. |
| 7,210,836 B2 | 5/2007 | Sasagawa et al. |
| 7,530,721 B2 | 5/2009 | Mi et al. |
| 2001/0001566 A1 | 5/2001 | Moseley et al. |
| 2002/0005921 A1 | 1/2002 | Sasakura et al. |
| 2002/0036729 A1 * | 3/2002 | Ohkawa ......................... 349/65 |
| 2002/0126389 A1 | 9/2002 | Moseley et al. |
| 2004/0046910 A1 | 3/2004 | Sasakura et al. |
| 2004/0130884 A1 | 7/2004 | Yoo et al. |
| 2005/0052750 A1 | 3/2005 | King et al. |
| 2005/0073625 A1 | 4/2005 | Daiku et al. |
| 2005/0276071 A1 | 12/2005 | Sasagawa et al. |
| 2005/0280894 A1 | 12/2005 | Hartkop et al. |
| 2006/0050047 A1 | 3/2006 | Jin et al. |
| 2007/0126691 A1 | 6/2007 | Lin et al. |

FOREIGN PATENT DOCUMENTS

| | | |
|---|---|---|
| WO | WO 2004/008226 | 1/2004 |
| WO | WO 2004/027492 | 4/2004 |
| WO | WO 2005/088599 | 9/2005 |

* cited by examiner

STEREOSCOPIC 3D LIQUID CRYSTAL DISPLAY APPARATUS WITH STRUCTURED LIGHT GUIDE SURFACE

CROSS-REFERENCE TO RELATED APPLICATION

This application claims the benefit of U.S. Provisional Application Ser. No. 60/828,399 filed Oct. 6, 2006.

FIELD

The present disclosure relates to a stereoscopic 3D liquid crystal display apparatus and particularly to a stereoscopic 3D liquid crystal display apparatus including a structured light guide surface.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically ¹/₆₀ of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

BRIEF SUMMARY

The present disclosure relates to a stereoscopic 3D liquid crystal display apparatus and particularly to a stereoscopic 3D liquid crystal display apparatus including a structured light guide surface.

In a first embodiment, a stereoscopic 3D liquid crystal display apparatus includes a liquid crystal display panel, a backlight positioned to provide light to the liquid crystal display panel, and a double sided prism film disposed between the liquid crystal display panel and the backlight. The backlight includes a light guide having a first side and a second side opposite the first side, and having a first surface extending between the first and second sides and a second surface opposite the first surface. The first surface substantially re-directs light and the second surface substantially transmits light. A plurality of first light sources is arranged along the first side of the light guide for transmitting light into the light guide from the first side. A plurality of second light sources is arranged along the second side of the light guide for transmitting light into the light guide from the second side. The second surface includes a regular array of linear prism or lenticular features. A double sided prism film is disposed between the liquid crystal display panel and the regular array of linear prism or lenticular features.

In another embodiment, a stereoscopic 3D liquid crystal display apparatus includes a liquid crystal display panel, drive electronics configured to drive the liquid crystal display panel with alternating left eye and right eye images, and a backlight positioned to provide light to the liquid crystal display panel. The backlight includes a backlight positioned to provide light to the liquid crystal display panel. The backlight includes a light guide having a first side and a second side opposite the first side, and having a first surface extending between the first and second sides and a second surface opposite the first surface. The first surface substantially re-directs light and the second surface substantially transmits light. A plurality of first light sources is arranged along the first side of the light guide for transmitting light into the light guide from the first side. A plurality of second light sources is arranged along the second side of the light guide for transmitting light into the light guide from the second side. The second surface includes a regular array of linear prism or lenticular features that extend parallel to a light input propagation axis of the plurality of first and second light sources. A double sided prism film is disposed between the liquid crystal display panel and the regular array of linear prism or lenticular features.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
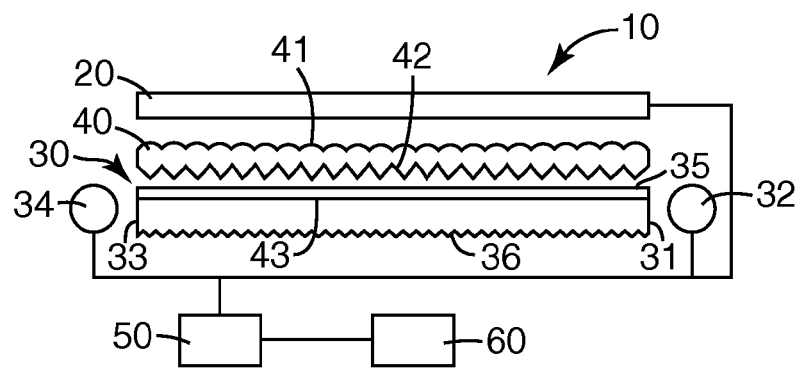
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "elongated" feature refers to a linear feature having substantially the same cross-section along a linear length of the feature.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a stereoscopic 3D liquid crystal display apparatus and particularly to a stereoscopic 3D liquid crystal display apparatus including a structured light guide surface. This apparatus can provide a uniformly lit 3D image with increased light extraction efficiency relative to unstructured light guide. This disclosure presents a backlight for a stereoscopic 3D liquid crystal display that includes microreplicated structures that provides substantially uniform transmission of light emitted from the backlight and transmitted into a double-sided prism film. This configuration reduces or eliminates "headlighting" or imaging of discrete backlight light sources, such as light emitting diodes, improves overall light extraction efficiency of the backlight, while maintaining the angular distribution of the light out of the backlight. Maintaining the angular distribution of the light out of the backlight allows the stereoscopic 3D liquid crystal display apparatus to continue to provide a stereoscopic 3D image to a viewer.

One or more of these embodiments may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the backlight 30 plurality of first and second plurality of light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33 and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

The second surface 35 (i.e., light transmission surface 35) includes a plurality of microreplicated features 43. These features 43 are illustrated as v-shaped grooves, rectangular channels, elongated prism or lenticular features 43 (see FIG. 3) that extend parallel to a light input propagation axis $P_A$ of the plurality of first light sources 32 and plurality of second light sources 34. The light input propagation axis $P_A$ generally refers to a centerline axis of light propagating through the light guide. In many embodiments, the microreplicated features 43 are a regular array of linear prism or lenticular features. In many embodiments, the elongated features 43 extend orthogonal to the adjacent elongated prism features 42 or lenticular features 41 of the double prism film 40. These features 43 are further described with reference to FIG. 3 below.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSWO20B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having elongated lenticular features 41 structure on a first side or major surface and elongated prismatic features 42 on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
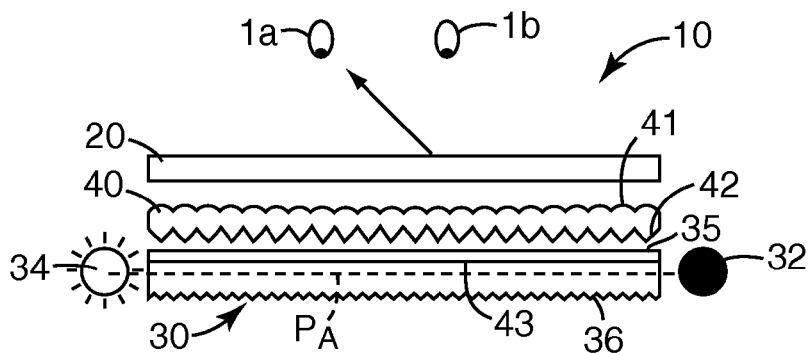
FIG. 2A and FIG. 2B are schematic side views of an illustrative display apparatus in operation.
Figure 2B:
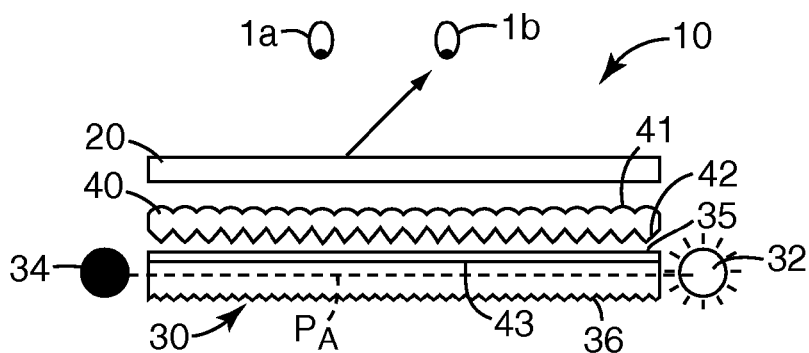

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the backlight 30 microreplicated features 43, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30 microreplicated features 43, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

Liquid crystal display panels 20 have a refresh or image update rate that is variable, but for the purposes of this example, a 60 Hz refresh rate is presumed. This means that a new image is presented to the viewer every $\frac{1}{60}$ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

Figure 3:
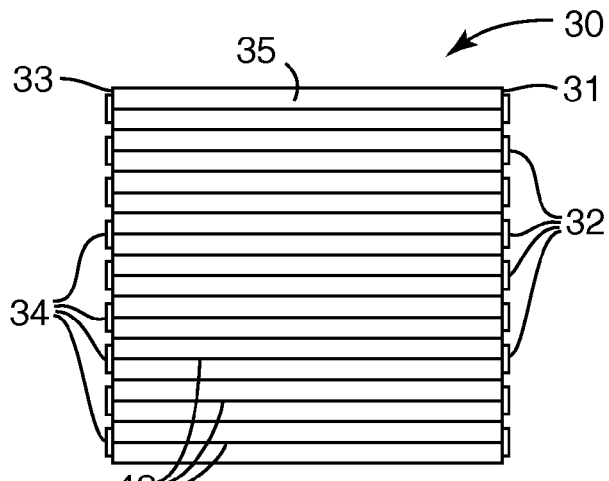
FIG. 3 is a schematic diagram front view of an illustrative backlight for displaying alternating right and left images.

FIG. 3 is a schematic diagram front view of an illustrative backlight 30 for displaying alternating right and left images. The backlight 30, as described above, includes a first side 31 or first light input surface 31 adjacent to the plurality of first light sources 32 or right eye image solid state light source 32, and an opposing second side 33 or second light input surface 33 adjacent to the plurality of second light sources 34 or left eye image solid state light source 34. A first surface 36 (shown in FIG. 1) extends between the first side 31 and second side 33 and a second surface 35, opposite the first surface, extends between the first side 31 and second side 33. The first surface 36 substantially re-directs (e.g., reflects, extracts, and the like) light and the second surface 35 substantially transmits light to the double sided prism film (through the features 43) and LCD panel, as described in FIG. 1.

The microreplicated features 43 are elongated and in many embodiments, are disposed parallel to one another and also parallel to a light input propagation axis $P_A$ of the first plurality of light sources 32 and second plurality of light sources 34. The microreplicated features 43 can extend in a side-by-side parallel manner between the first side 31 and the second side 33. In many embodiments, the microreplicated features 43 or regular array of linear prism or lenticular features 43 have optical power in a vertical direction and negligible optical power in an orthogonal horizontal direction. These microreplicated features 43 reduce or eliminate "headlighting" or imaging of the discrete solid state light sources, improve overall light extraction efficiency of the backlight, while maintaining the angular distribution of the light out of the backlight.

Figure 4:
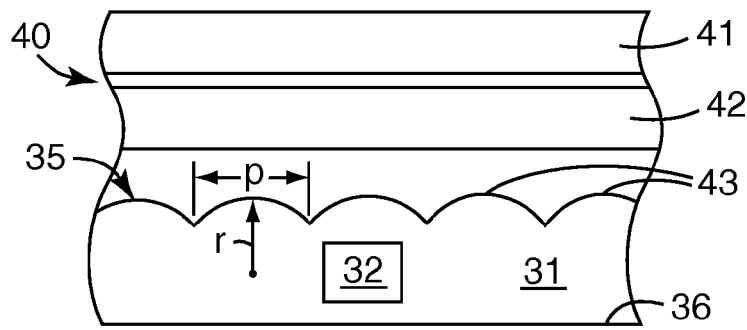
FIG. 4 is an illustrative schematic side view of the light input side of the disclosed backlight.
Figure 5:
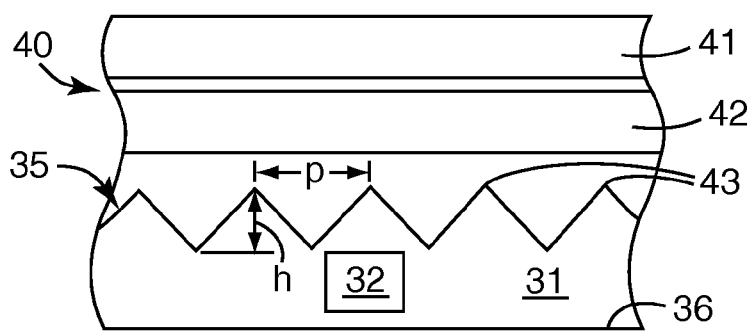
FIG. 5 is another illustrative schematic side view of the light input side of the disclosed backlight.

FIG. 4 and FIG. 5 provide illustrative schematic side views of the light input side 31 of the disclosed backlight 30. The backlight microreplicated features 43 are adjacent to the double sided prism film 40 having elongated lenticular features 41 on a first side or major surface and elongated prismatic features 42 on an opposing side. In many embodiments, the elongated lenticular features 41 structure on a first side or major surface and elongated prismatic features 42 on an opposing side extend orthogonal to the backlight microreplicated elongated features 43.

FIG. 4 is one embodiment illustrating lenticular features 43 that are elongated and disposed parallel to one another and also parallel to a light input propagation axis $P_A$ of the first plurality of light sources 32. These lenticular features 43 have a radius of curvature r in a range from 1 to 250 micrometers or from 10 to 100 micrometers, or from 25 to 75 micrometers. FIG. 5 is one embodiment illustrating prism features 43 that are elongated and disposed parallel to one another and also parallel to a light input propagation axis $P_A$ of the first plurality of light sources 32. These prism features 43 have a height h in a range from 1 to 250 micrometers or from 1 to 75 micrometers, or from 5 to 50 micrometers. In many embodiments, the parallel elongated microreplicated features 43 described above have a period or pitch p (e.g., from apex to apex, or from feature to feature) in a range from 1 to 1000 micrometers, or from 1 to 500 micrometers, or from 1 to 250 micrometers, or from 1 to 100 micrometers, or from 10 to 75 micrometers.

The microreplicated features 43 can be placed or formed in the second surface 35 (light transmission surface of backlight 30) by any useful method. In many embodiments, the microreplicated features 43 are molded or cut into the second surface 35. In other embodiments, the microreplicated features 43 are provided on a separate layer or film that is adhered to the second surface 35.

Thus, embodiments of the STEREOSCOPIC 3D LIQUID CRYSTAL DISPLAY APPARATUS WITH STRUCTURED LIGHT GUIDE SURFACE are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A stereoscopic 3D liquid crystal display apparatus, comprising:
    a liquid crystal display panel;
    a backlight positioned to provide light to the liquid crystal display panel, the backlight comprising:
        a light guide having a first side and a second side opposite the first side, and having a first surface extending between the first and second sides and a second surface opposite the first surface, wherein the first surface substantially re-directs light and includes a regular array of linear prism or lenticular features and the second surface substantially transmits light and includes a regular array of lenticular features, each lenticular feature having a radius of curvature along an entire width of the lenticular feature;
        a plurality of first light sources arranged along the first side of the light guide for transmitting light into the light guide from the first side; and
        a plurality of second light sources arranged along the second side of the light guide for transmitting light into the light guide from the second side, and
    a double sided prism film disposed between the liquid crystal display panel and the second surface.

2. A stereoscopic 3D liquid crystal display apparatus according to claim 1, further comprising drive electronics configured to drive the liquid crystal display panel with alternating left eye and right eye images.

3. A stereoscopic 3D liquid crystal display apparatus according to claim 2, wherein the plurality of first light sources or plurality of second light sources selectively transmit light into the light guide first side or light guide second side based upon whether a right or left image is displayed on the liquid crystal display panel.

4. A stereoscopic 3D liquid crystal display apparatus according to claim 1, wherein the plurality of first light sources and plurality of second of light sources are turned on or off in an alternating order between the plurality of first light sources and plurality of second light sources.

5. A stereoscopic 3D liquid crystal display apparatus according to claim 2, further comprising a synchronization driving element electrically coupled to the plurality of first light sources and plurality of second light sources and the synchronization driving element synchronizes turning the plurality of first light sources and plurality of second light sources on or off in an alternating order based on whether a left eye image or right eye image is displayed on the liquid crystal panel.

6. A stereoscopic 3D liquid crystal display apparatus according to claim 1, wherein the second surface regular array of lenticular features provide substantially uniform transmission of light from the backlight into the double-sided prism film and improve a light extraction efficiency of the backlight.

7. A stereoscopic 3D liquid crystal display apparatus according to claim 1, wherein the second surface regular array of lenticular features comprises lenticular features that extend parallel to a light input propagation axis of the first plurality of light sources and second plurality of light sources.

8. A stereoscopic 3D liquid crystal display apparatus according to claim 1, wherein the second surface regular array of lenticular features comprises lenticular features that extend orthogonal to adjacent elongated prism or lenticular features of the double-sided prism film.

9. A stereoscopic 3D liquid crystal display apparatus according to claim 1, wherein the second surface regular array of lenticular features comprises lenticular features that extend parallel to a light input propagation axis of the first plurality of light sources and second plurality of light sources and the second surface elongated lenticular features extend orthogonal to adjacent elongated prism or lenticular features of the double-sided prism film.

10. A stereoscopic 3D liquid crystal display apparatus according to claim 1, wherein the double-sided prism film includes a first major surface comprising a plurality of elongated lenticular features and a second major surface, opposing the first major surface, comprising a plurality of elongated prism features.

11. A stereoscopic 3D liquid crystal display apparatus, comprising:
a liquid crystal display panel;
drive electronics configured to drive the liquid crystal display panel with alternating left eye and right eye images;
a backlight positioned to provide light to the liquid crystal display panel, the backlight comprising:
a light guide having a first side and a second side opposite the first side, and having a first surface extending between the first and second sides and a second surface opposite the first surface, wherein the first surface substantially re-directs light and the second surface substantially transmits light;
a plurality of first light sources arranged along the first side of the light guide for transmitting light into the light guide from the first side; and
a plurality of second light sources arranged along the second side of the light guide for transmitting light into the light guide from the second side, and
the second surface includes a regular array of non-planar lenticular features that extend parallel to a light input propagation axis of the plurality of first and second light sources; and
the first surface includes a regular array of linear prism or lenticular features that extend orthogonal to a light input propagation axis of the plurality of first and second light sources;
a double sided prism film is disposed between the liquid crystal display panel and the regular array of linear prism or lenticular features.

12. A stereoscopic 3D liquid crystal display apparatus according to claim 11, wherein the plurality of first or second light sources comprise light emitting diodes.

13. A stereoscopic 3D liquid crystal display apparatus according to claim 11, wherein the second surface regular array non-planar lenticular features comprises elongated non-planar lenticular features that extend orthogonal to adjacent elongated prism or lenticular features of the double-sided prism film.

14. A stereoscopic 3D liquid crystal display apparatus according to claim 11, further comprising a synchronization driving element electrically coupled to the plurality of first and second light sources and the synchronization driving element synchronizes turning the first and second plurality of light sources on or off in an alternating order based on whether a left eye image or right eye image is displayed on the liquid crystal panel.

15. A stereoscopic 3D liquid crystal display apparatus according to claim 11, wherein the second surface regular array of linear non-planar lenticular features are arranged to provide substantially uniform transmission of light from the backlight into the double-sided prism film and improve a light extraction efficiency of the backlight.

16. A stereoscopic 3D liquid crystal display apparatus according to claim 11, wherein the second surface regular array of linear non-planar lenticular features extend parallel to a light input propagation axis of the plurality of first and second light sources.

17. A stereoscopic 3D liquid crystal display apparatus according to claim 11, wherein the double-sided prism film includes a first major surface comprising a plurality of elongated lenticular features and a second major surface, opposing the first major surface, comprising a plurality of elongated prism features.

18. A stereoscopic 3D liquid crystal display apparatus according to claim 11, wherein the second surface regular array of linear non-planar lenticular features have optical power in a vertical direction and negligible optical power in an orthogonal horizontal direction.

19. A stereoscopic 3D liquid crystal display apparatus according to claim 9, wherein the first surface regular array of linear prism or lenticular features comprises linear prism or lenticular features that extend orthogonal to a light input propagation axis of the first plurality of light sources and second plurality of light sources.

20. A stereoscopic 3D liquid crystal display apparatus according to claim 11, wherein each of the non-planar lenticular features have a radius of curvature in a range from 10 to 100 micrometers.

* * * * *

UNITED STATES PATENT AND TRADEMARK OFFICE
CERTIFICATE OF CORRECTION

| | | |
|---|---|---|
| PATENT NO. | : 8,035,771 B2 | Page 1 of 1 |
| APPLICATION NO. | : 11/865916 | |
| DATED | : October 11, 2011 | |
| INVENTOR(S) | : Brott et al. | |

It is certified that error appears in the above-identified patent and that said Letters Patent is hereby corrected as shown below:

Column 8
Line 50, after "second" delete "of".

Column 10
Line 6, after "array" insert -- of --.

Column 10
Line 20, after "of" delete "linear".

Column 10
Line 26, after "of" delete "linear".

Column 10
Line 37, after "of" delete "linear".

Signed and Sealed this
Seventh Day of February, 2012

David J. Kappos
*Director of the United States Patent and Trademark Office*